Hans-Joachim Schmidt
Theodor Voeste
Inventors.

By Karl G. Ross
Attorney

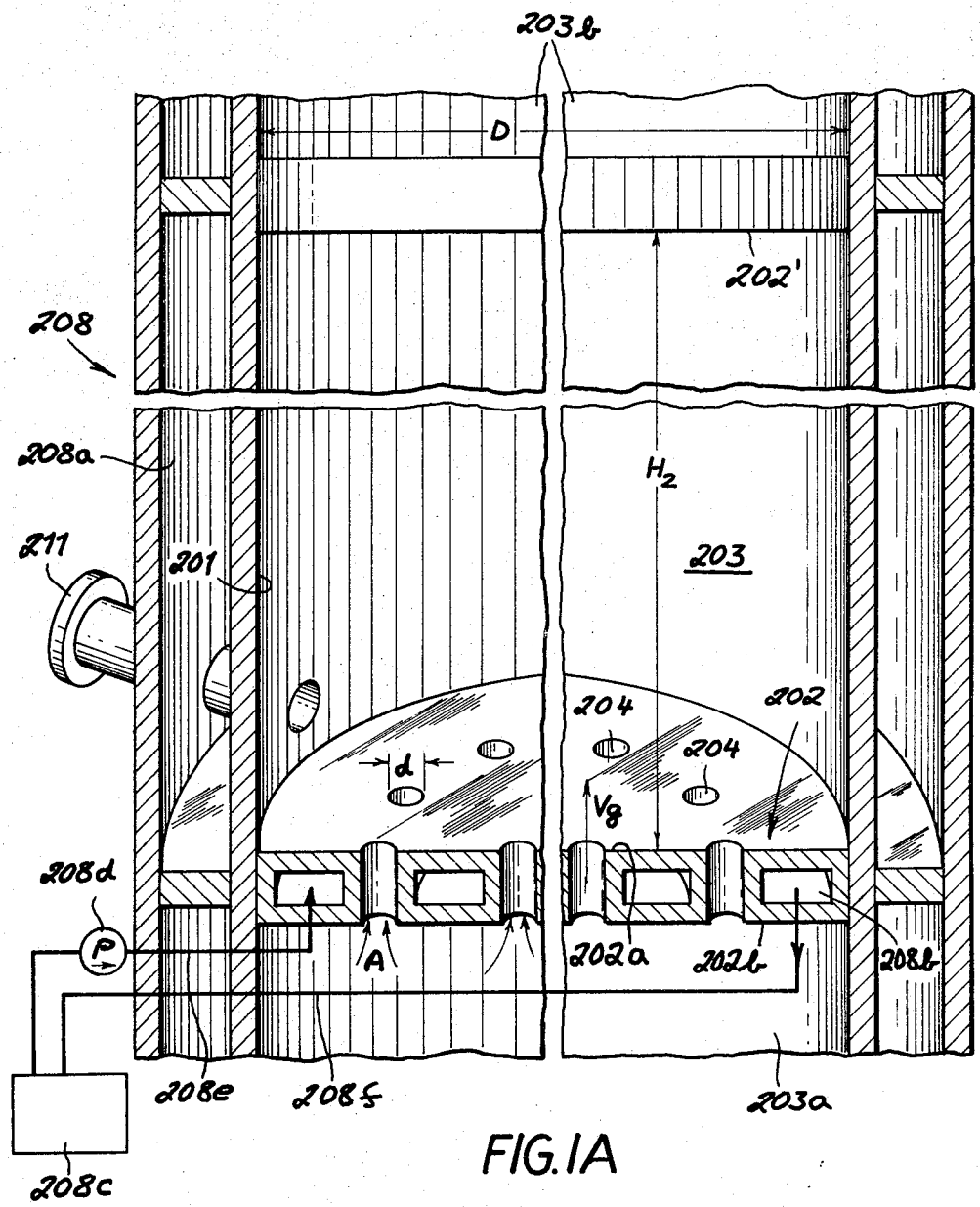
FIG. IA

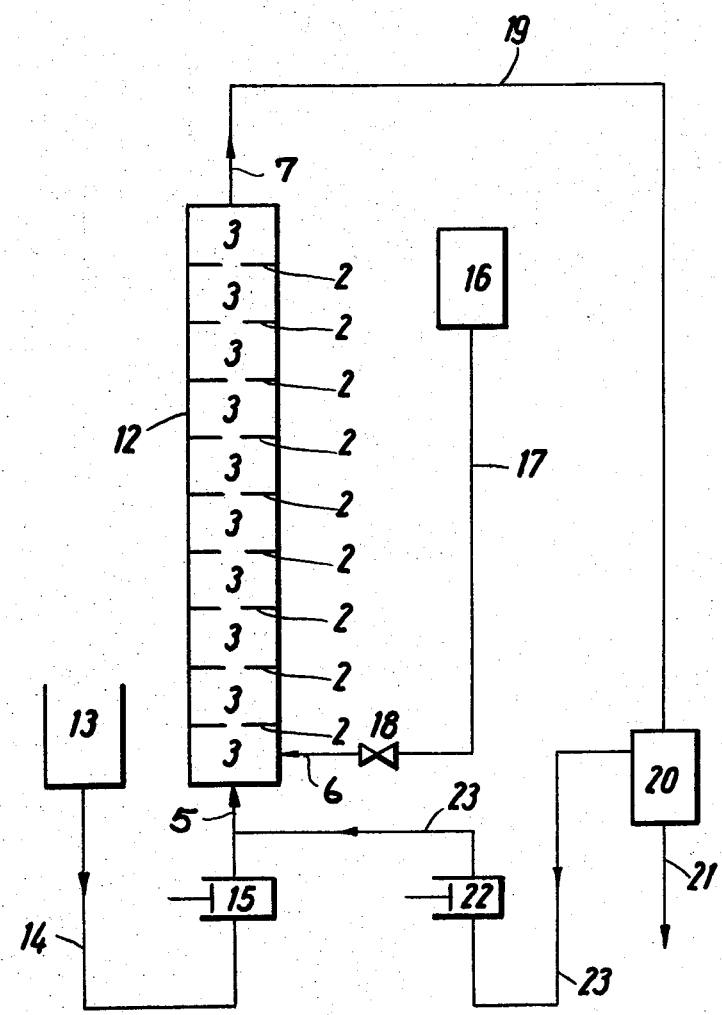

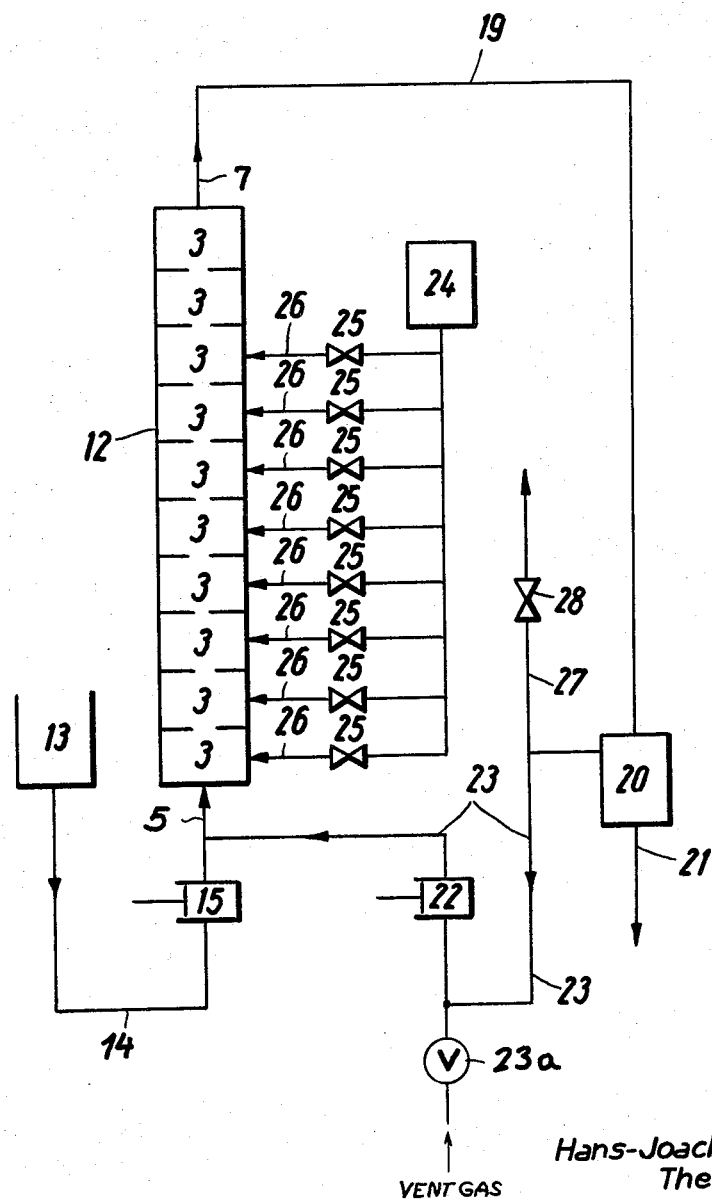

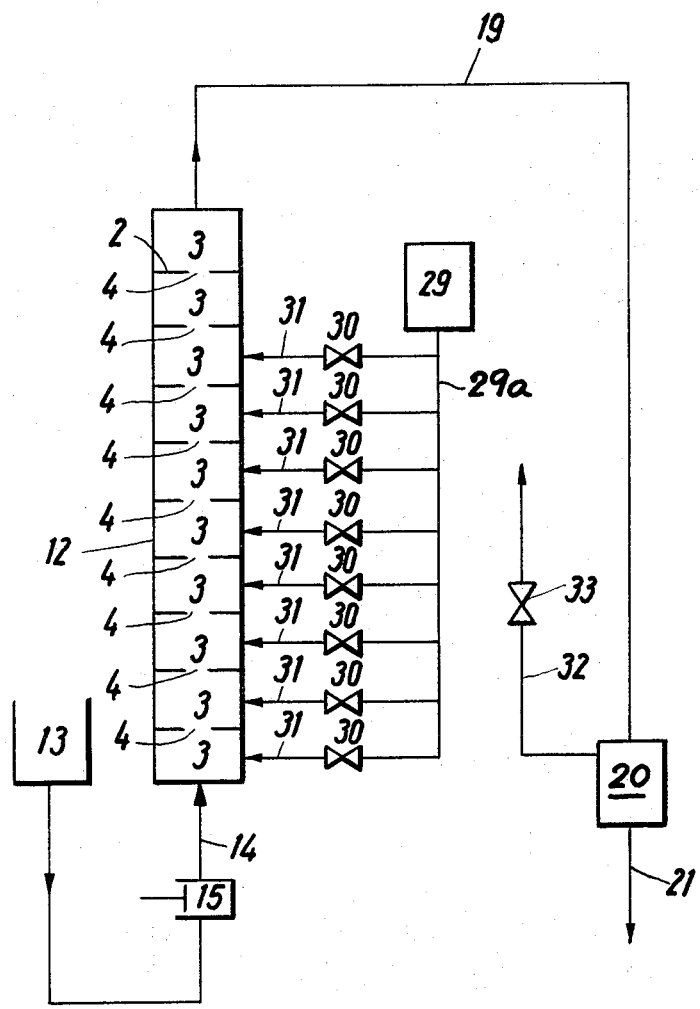

United States Patent Office 3,701,793
Patented Oct. 31, 1972

3,701,793
METHOD OF CARRYING OUT LIQUID GAS REACTIONS
Hans Joachim Schmidt and Theodor Voeste, Frankfurt, Germany, assignors to Metallgesellschaft AG, Frankfurt am Main, Germany
Filed Dec. 31, 1969, Ser. No. 889,564
Int. Cl. C11c 3/12
U.S. Cl. 260—409                    1 Claim

ABSTRACT OF THE DISCLOSURE

A chemical-reactor method, wherein a liquid phase and a gas phase are passed upwardly through unpacked reaction chambers in a reactor column. The chambers are separated from one another by perforated plates with openings such that the linear gas velocity through the plates is 1 to 50 meters per second.

FIELD OF THE INVENTION

Our present invention relates to a method of carrying out liquid-phase/gas-phase chemical reactions and, more particularly, to a system for increasing the efficiency of such reactions as may rely upon the intimate contact of a gaseous phase with a liquid phase.

BACKGROUND OF THE INVENTION

The chemical-reactor art has heretofore proposed a number of basic techniques for carrying out liquid/gas reactions in which intimate contact of the liquid phase and the gas phase is provided. Such systems may make use of vertical partitions producing undulating paths for the respective fluid in counter-current for intimate relation, or so-called "packed" columns in which the flow space is filled with a multiplicity of packings in a packing-tower configuration. Typical packings range from Raschig rings, which are cylindrical bodies with unobstructed central openings, to perforated bodies having ribs or vanes filling the central opening, from saddle-shaped structures to coils and the like.

The vertical partitions of the first-mentioned type of chemical reactors are designed to promote the rapid circulation of the reaction mixture and, to this end, the reaction mixture is drawn continuously from an upper part of the reactor and recirculated or reintroduced through a lower portion thereof.

In the packed type of reactor, similar circulation may be provided although the columns are generally towers of a length sufficient to ensure completion to the desired degree of the reaction, prior to removal of the gas phase at the upper end and countercurrent removal of the liquid phase below the support plate for the packing.

Upon leaving the reactor, the gas and liquid phases are separated from one another and part or all of the recovered gas can be returned to the reactor by a circulating pump. The reactor generally was provided with heating or cooling elements to dissipate the energy released by an exothermic reaction or to supply the energy necessary for an endothermic reaction or simply to maintain the reaction temperature constant by counteracting heat loss to or take up from the environment.

OBJECT OF THE INVENTION

It is the principal object of the present invention to provide a method of carrying out gas-phase/liquid-phase reactions in which a more intimate relationship of the phases can be achieved than has been possible heretofore, and the reaction efficiency thereby increased.

A corollary object of this invention is to provide an improved system for carrying out a liquid/gas chemical interaction, the system being relatively simple and free from breakdown or obstruction, enabling high throughputs of the reactants, and promoting intimate contact between the liquid and gas phases.

SUMMARY OF THE INVENTION

We have achieved these objects in a chemical reactor for carrying out liquid/gas interaction which comprises a vertical column provided with at least one "tray," plate or "bottom" having openings or the like through which the liquid phase ascends upwardly along with the gas in the manner a bubble column of the type heretofore employed in liquid/gas separation by fractional distillation and the like.

The invention resides in our discovery that, when the horizontal tray, plate or bottom has one or more openings for upward flow of the gas phase therethrough, and these openings and the pressure differential across the tray is such that the linear velocity of the gas in the openings is 1 to 50 m./second, the chemical reaction is promoted to a surprising degree with no loss of throughput or reaction efficiency, so that the overall efficiency of the reaction system is considerably increased.

The space-time efficiency characteristics of the reactor are, under these conditions, far better than those of a reactor using vertically extending partitions or subdividers, in spite of the fact that the velocity along these partitions in the prior-art system may be within the aforesaid range. While we are unable to explain, at this time, the reason for the unexpected improvement in the reaction efficiency using bubble plates whose openings are traversed by an upwardly moving gas at velocities of 1 to 50 m./second, over columns with vertical subdividers and similarly rapid gas streams, we believe that it is a consequence of the different type of interaction between the gas and liquid phases that occurs as the gas enters the opening, as the gas traverses this relatively short constriction, and as the gas contacts the liquid upon passing from the opening into the upper chamber. It has been found, for example, that the reactor operates best when the chambers on either side of the tray are free from packing and thus are plenum chambers.

According to a further feature of this invention, the upright column is generally cylindrical and is subdivided in the vertical direction by a multiplicity of plates or bottoms, each of which defines a reaction chamber above the plate, and a second reaction chamber below the plate, the reaction chambers being interconnected through at least one but preferably a plurality of openings in the plate through which the gas passes at a velocity of 50 m./second.

It has been found to be advantageous to provide up to 50 such trays or plates, although best results are obtainable with reactors containing 5 to 20 stacked reaction chambers.

It is important to the principles of the present invention, moreover, that the free space of the reactor chamber not be unlimited and, indeed, it is essential that the ratio between the chamber height to the chamber diameter lie between 0.3:1 and 5:1, preferably between 0.8:1 and 2:1.

According to a further feature of this invention, the horizontal plates, which subdivide the reactor internally into a plurality of reaction chambers to either side of the particular tray, are provided with openings for the throughflow of gases and the liquid phase as previously observed. The transition of the gases and the liquid from one chamber to the next is provided only from below, upwardly and a reverse flow or backflow of liquid or gas is precluded.

It has been found that a velocity of 1 to 50 m./second ensures total elimination of the backflow which is essential to the present invention, especially when 10 to 50 uniformly distributed openings are provided per m.² of the trays and the openings are circular bores having a diameter between 3 and 20 mm. per opening. To establish the liquid gas velocity, we may vary the number and cross-section of the individual openings for a given gas volume and pressure drop across the reactor or, with a constant distribution of the openings and opening cross-section, vary the throughput of the gas or the pressure differential. The trays may be removable to permit adjustment of the hole distribution and cross-section.

It will be immediately evident that the present invention differs substantially from tray column for the fractional distillation of liquids or the fractional separation of liquefied gases and the like wherein a physical process is performed and liquid phase commonly moves in a generally downward direction while a gas phase moves in a generally upward direction, the gas and liquid phases passing in counterflow through the apparatus. In such cases, liquid accumulates upon the tray which, unlike the trays of the present system, have weirs or the like for storing the liquid in a layer of predetermined height, through which the gas bubbles.

By contrast, the present invention provides for a chemical process with an upward movement of the liquid and gas phases in common through the chambers from the bottom of the column to an outlet at the top thereof or at any intermediate location, the column being generally filled with the liquid through which the gas is passed. There are no weirs or layers of well-defined height in the system of the present invention and the gas functions also as a valve means preventing any downward flow of liquid whatsoever. There is, consequently, a total entrainment of the liquid upwardly, together with an intimate mixture of the liquid and the gas in the openings through which both must pass in a concurrent, rather than countercurrent, flow in addition to the expected contact of the gas with the liquid in the reaction chambers separated by the trays.

Since the partitions between the reaction chambers are simple perforated plates, the reactor is of limited cost and is very simple even if, for example, plates of the bubble-cap columns type are used. It has also been found that the reactor of the present invention reduces sharply the reaction time in many types of chemical reactions and thereby reduces the formation of byproducts which otherwise tend to become substantial. Since byproduct formation is reduced, the reactor can be used to carry out successive reaction steps in a complex overall reaction without concern that the subsequent steps in a complex overall reaction without concern that the subsequent steps may be restricted or limited or modified by the presence of the byproducts.

Still another feature of this invention resides in the provision of a double-wall housing for the reactor or a heat-exchange jacket therefor, thereby creating a chamber enveloping the reaction chamber. A heating or cooling medium may be circulated through the jacket to provide the heat necessary for endothermic reaction, to extract the heat produced by exothermic reactions, or simply to maintain a constant reaction temperature. The jacket or heat-exchange chamber may, moreover, be subdivided so that the individual reaction chambers or individual groups of reaction chambers may be individually cooled or heated, or cooled and heated in groups, as desired.

We may also provide additional heating and cooling elements in the reactor as is necessary. However, we prefer to constitute the perforated plates or trays as hollow members or to provide the perforated plates with fluid conduits through which the heating or cooling medium can be circulated. This latter system is highly advantageous since it provides heating or cooling at the region of the most intimate contact of the liquid with the gas, i.e. at the region in which the gas traverses the openings in these plates.

When all or a major part of the liquid phase reactant or the gas-phase reactant is introduced into the first reaction chamber, i.e. the lowest reaction chamber, the major part of the chemical reaction occurs in this chamber. In many cases it is desirable to increase the dimensions of the first chamber or the first few chambers to increase the volume of the reacting materials therein and thus avoid excessively concentrated reaction activity. This expedient, which is a feature of the invention, enables the temperature to be controlled more easily whether the reaction is exothermic or endothermic in nature. It is also possible to achieve this result by maintaining the temperature of the first chamber or first few chambers at a level below that of the higher chambers.

Still another feature of this invention resides in the provision of respective inlets at each or at least some of the chambers, preferably in the lateral walls thereof, by which part or all of a reactant (gas or liquid phase) can be introduced into the individul chambers with the totality of the reactant being distributed over the entire set of reactor chambers. It will be understood that such individual inlets may be used for a lower group of reaction chambers, in which case the initial reactants are distributed over this group, while an upper group may be used to sustain an afterreaction or subsequent one.

The reactor is hermetically sealed to enable the reaction to be carried out at a reduced or subatmospheric pressure, at normal or atmospheric pressure, or at elevated or superatmospheric pressure, depending upon the requirements of the reaction scheme. Furthermore, it is preferably carried out continuously although it is also possible to use the reactor in intermittent modes of operation with approximate intermittent addition of liquid but continuous addition of gas. Moreover, the apparatus is not limited to a particular chemical reaction and may be used with practically all reactions involving liquid and gas phases. For example, the reaction of a liquid and a gas to form another liquid, thereby eliminating the gas phase entirely at the outlet and of the reactor except for any excess gas which may be introduced under the mass-action principles to drive the reaction to completion. It also may involve two liquids which chemically combine to form a liquid and a gas and the reaction between a liquid and a gas which form different liquids and gases.

The term "liquid" and "gas" or "liquid phase" and "gas phase" are used herein to designate both pure substances and mixtures of substances in the respective physical states. A "liquid$_1$+gas=liquid" reaction is exemplified by hydrogenation reactions in which a liquid organic medium may be hydrogenated in the presence of suitable catalysts. Typical of the "liquid$_1$+liquid$_2$=liquid$_3$+gas$_1$" systems is the reaction of chlorinated paraffin with benzene while the "liquid$_1$+gas$_1$=liquid$_2$+gas$_2$" type of reaction may be represented by the chlorination of organic compounds. In the second type of reaction, the gas is a product and part or all of it may be recirculated to the reactor to constitute the gas flowing through the bubble plates with the indicated velocity.

DESCRIPTION OF THE DRAWING

The above and other objects, features and advantages of the present invention will become more readily apparent from the following description and examples, reference being made to the accompanying drawing in which:

FIG. 1A is a perspective cross-section illustrating a portion of the chemical reactor;

FIGS. 3–5 are flow diagrams showing how the system of FIG. 1 or the system of FIG. 2 may be used under different circumstances.

SPECIFIC DESCRIPTION

Figure 1:
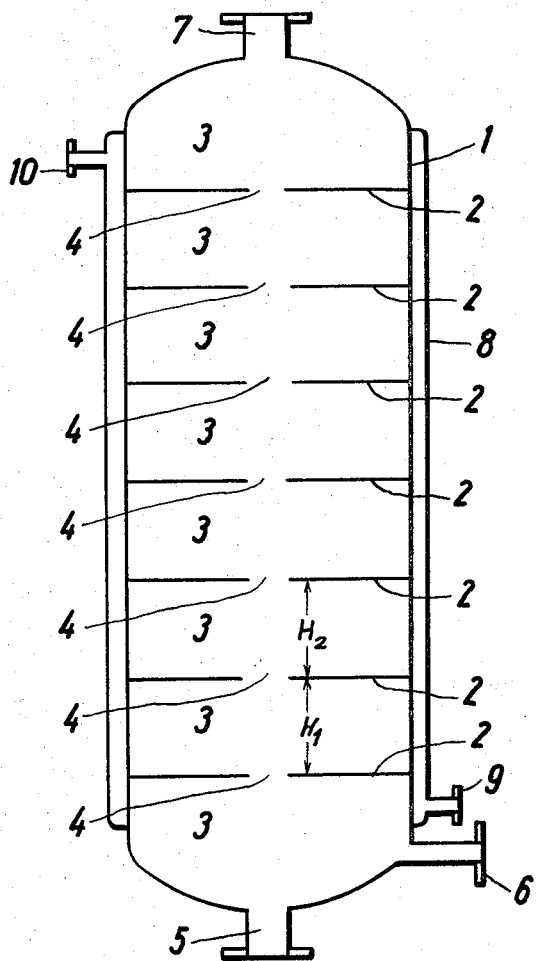
FIG. 1 is a diagrammatic vertical cross-section through a chemical reactor in accordance with the present invention.

The reactor of FIG. 1 comprises a cylindrical housing 1 which is subdivided vertically by seven horizontal perforated plates 2 into eight reaction chambers 3 as illustrated structurally in FIG. 1A. The perforated plates 2 separating the chambers 3 above and below each plate, are interconnected by openings 4 as has been described above. In this system, only a single opening 4 is provided at the center of each plate, although each plate may be provided with a multiplicity of such openings as has been described above.

The housing 1 is provided with an inlet 5 along its axis and at the bottom for introduction of one of the reactant phases into the system. A radial inlet 6 may supply the other phase. The inlets 5 and 6 are of the flanged-fitting type and are designed to be connected by screws, clamps or welding in a pipe system from which the reactants can be derived. It will be understood that but a single inlet is necessary for both reactants although there may be a disadvantage in such an arrangement as a consequence of premature reaction of the components before they enter the reactor. Consequently, we prefer to introduce the two phases separately into the reactor at a lower portion, here represented as the bottom reaction chamber 3. It will be noted, moreover, that the bottom reaction chamber 3 has a height $H_1$ which exceeds the height $H_2$ of the reaction chamber 3 above the initial chamber, whereby the volume capacity of the lower reaction chamber is greater than the capacity of the more downstream chambers in the path of the reaction system. The gas and liquid move in common upwardly through the reactor from one chamber 3 to the next, with the bubbles of gas traversing the openings 4 with a linear velocity of 1 to 50 m./second, thereby totally excluding any backflow of reactants or reaction products.

The final reaction mixture is withdrawn from the head of the cylindrical column via the outlet fitting 7. Around the reaction vessel, we provide a heat-exchange jacket 8 which may extend over some or all of the reaction chambers 3 and may be subdivided for circulation of heat-exchange fluid specific to one or more of the reaction chambers. An inlet 9 and an outlet 10 are provided for the heat-exchange medium which may be a heating fluid when the reaction is endothermic or a cooling fluid when the reaction is exothermic.

Figure 2:
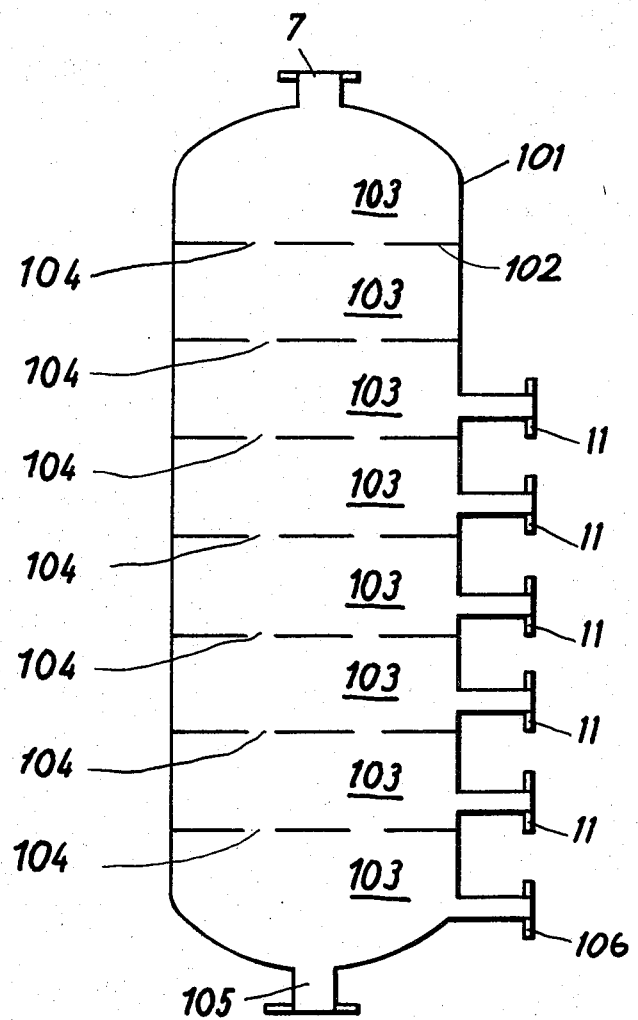
FIG. 2 is a longitudinal section through another embodiment of the invention.

The reactor shown in FIG. 2 differs from that of FIG. 1 in that the cylindrical vessel 101 is internally subdivided by perforated plates 102 each having several openings 104 to connect the reaction chambers 103 separated by these plates. In place of the heat-exchange jacket, the plates 102 may be hollow, as illustrated for the system of FIG. 1A, or else the jacket arrangement of FIG. 1 can be employed with the heated plate system of FIG. 1A. In this case, only part of the reactant mixture is formed in the lowest chamber 103 by introducing the liquid and gas phases via the inlets 105 and 106 into this bottom chamber. The rest of a reactant phase, e.g. the gas phase or the liquid phase, may be introduced via inlet fittings 11, each of which communicates with a respective reaction chamber 103 above the lowest reaction chamber. The two uppermost reaction chambers are shown not to have inlets 11 and serve to permit completion of the reaction without further addition of the reactants. Each of the inlets 11, moreover, may be used for both the liquid and the gas phases.

In FIG. 3, we have shown an arrangement which is particularly suited to a reaction of a first liquid and a gas to yield a second liquid, ideally there being no gas at the outlet. However, for mass-action displacement of the equilibrium in the direction of the complete reaction of the first liquid, it is customary to employ an excess of the gas especially when the excess is required to maintain the linear gas velocity through the openings 4 at 1 to 50 m./second. The reactor column 12 of FIG. 3 corresponds to the reactor of FIG. 1 and is provided with the perforated plate separators 2 and the reaction chambers 3 in superimposed relationship. Ten reaction chambers 3 are here provided by nine perforated-plate separators.

From the reservoir 13, a reactant liquid is drawn by a metering pump 15 and forced via line 14 into the column 12 through the axial inlet 5. A pressure tank, compressed or liquefied gas bottle or gas generator is represented at 16 and supplies the reactant gas to the column 12 via an inlet 6. The gas-feed line 17 has a valve 18 regulating the gas flow in accordance with the desired relationship of gas input to the first or reactant liquid. Here, too, the reaction mixtures passes upwardly from chamber to chamber without any backflow and at a linear gas velocity of 1 to 50 m./second. The reaction produces a second liquid which is drawn off from the head of the column via the outlet 7 and led to a gas/liquid separator 20. Excess or unreacted gas is returned at 23 to the reaction vessel 12 and is fed to the latter, at the inlet 5, via a metering pump 22 and a line 23. The reaction product is, of course, drawn off at 21.

In FIG. 4, we have shown a reactor system which may be used when a gas is produced. In this system, a first and a second liquid react to produce a third liquid and a gas which, in accordance with the principles of this invention, but be circulated or otherwise returned to the reaction chambers to flow at a velocity of 1 to 50 m./second through the hollow in the perforated plates. In this embodiment, the reactor of FIG. 1 or of FIG. 2 may be used and is again designated at 12. The reactor is subdivided into ten chambers by the perforated plates. From the reservoir 13, a reactant liquid or the several reactant liquids are supplied via line 14 and the metering pump 15 to the column 12 at the inlet 5. The liquid stream entering the reaction chamber may also entrain a slurry-type catalyst in the presence of which the reaction is carried out, initially or promoted. The second reactant, also of the liquid phase, is drawn from a reservoir 24 and supplied via lines 26 (fittings 11) to the lower eight reaction chambers 3, valves 25 controlling the distribution of the amount of this reactant among the reaction chambers. The reaction product, namely, the third liquid and the gas evolved during the reaction is withdrawn through outlet 7 and led via line 19 to a gas/liquid separator 20. The liquid is, of course, recovered at 21 while the gas (line 23) is returned to the column 12 via the metering pump 22 as previously described. In the event of an insufficiency of gas to maintain the indicated linear velocity through the openings in the plates separating the reaction chambers, a valve 23a may be opened to admit inert gas to the metering pump 22. In the event, excess gas is present, the excess may be bled off via line 27 and valve 28.

In FIG. 5, the system is designed for a reaction of a liquid and a gas to yield, as reaction products, another liquid and another gas. In this system, the column 12, which may have the construction illustrated in FIG. 2, is supplied from below at 14 with the reactant liquid from reservoir 13 by the metering pump 14. The reactant gas, however, is delivered from a pressure vessel 29 through a manifold 29a to the individual inlets 31 of the lower eight reaction compartments 3 at rates determined by the valves 30. The next liquid and gas reaction product is recovered from the column 19 separated into the respective phases at 20, the liquid being collected at 21. The gas may be discarded or reused and is led away from the separator by line 32 and valve 33.

In FIG. 1A, we have shown a portion of a reaction column according to the invention in which the reaction compartment 203 is separated from a lower compartment 203a by a perforated plate 202 and from an upper compartment 203b by the perforated plate 202' which may be identical to plate 202 which has been shown in section and somewhat in perspective form for greater clarity. It will be immediately apparent that, unlike conventional bubble-cap trays, the separating plates 202. etc. have planar upper and lower surfaces 202a and 202b, free from weirs, dams, overflows or the like which sustain predetermined thicknesses of liquid layers on conventional bubble-cap trays. The openings 204 in the plates 202 of this invention terminate flush with the planar surfaces 202a and 202b which reach to the wall 201 of the column. In this system, both gas and liquid pass upwardly (arrow A) through the perforated plates from lower chamber to higher chamber, the gas traversing the hollow 204 at a velocity $V_g = 1-50$ m./second. The reaction chambers have heights $H_2$ in a ratio to the diameter D of $H_2:D=0.3:1$ to 5:1 and preferably $2:1 \geq H_2:D \geq 0.8:1$. The number of openings 204 ranges between 10 and 50 per m.$^2$ and the diameter $d$ of the opening is between 3 and 20 mm.

From FIG. 1A, it will also be apparent that the individual compartments 203 can be associated with respective compartments 208a of a heating jacket 208 which may be supplied individually with a heating or cooling fluid by inlets and outlets of the type represented at 9 and 10 in FIG. 1, but not illustrated in FIG. 1A. Alternatively or in addition, the plates 202 may be hollow and provided with fluid channels 208b through which heating or cooling fluids may be circulated from a reservoir 208c by a pump 208d via lines 208e and 208f. Also, the individual compartments or some of them may be formed with fittings 211 through which reactants may be supplied to the individual compartments.

SPECIFIC EXAMPLES

Example I

In a system of the type shown in FIG. 3, using a column made from VA pressure pipe with an internal diameter D of 152 mm. and a total length of 6 m. subdivided internally by 9 VA plates each having a single cylindrical centrally positioned hole of a diameter of 7 mm., so that 10 equal-size reaction chambers are provided, a tallow-type stearin-containing fatty acid is catalytically hydrogenated. The reactor was heated by an electrical heating jacket to a temperature of 190° and is supplied with twenty liters per hour of the fatty acid having an iodine number of 53.4, by a continuously operating metering pump.

The fatty acid is mixed with 0.3 weight percent of a catalyst consisting of 50% by weight nickel and 50% by weight kieselguhr. The liquid, of course, is fed from the bottom and passes upwardly through the ten chambers of the reactor. Into the lowest chamber we pump, at 18–20 atmospheres (gauge), hydrogen in an amount of 1.2 cubic meters per hour at standard temperature and pressure. At least part of the hydrogen is supplied to the column upon recovery from the continuous affluent of the column which is separated. The hardenable product leaving the column is a stearin fatty acid having an iodine number of 0.72. Under the same conditions, except that the perforated plates were removed, the end product has an iodine number of 8.0. When the throughput of the fatty acid was reduced to 2.4 kilograms per hour, under otherwise similar conditions and upon removal of the perforated plates, the iodine number was about 0.72.

Example II

The system of FIG. 4 was employed with a reactor column consisting of ten glass tubes each with a diameter of 100 mm. and a length of 255 m. Between the glass sections, Teflon (polytetrafluoroethylene) discs were interposed between the glass sections, the discs each having a circular central hole of a diameter of 10 mm. Twenty kilograms per hour of benzene was fed to the reactor and entrained a slurry of 0.5 kilogram of aluminum chloride per hour.

Simultaneously and at a rate of 10 kilograms per hour, a mixture consisting of 46.0% by weight paraffin, of 37.3% by weight monochloroparaffin, and 16.7% by weight of higher chlorinated paraffins was fed into the column at the lower eight reaction chambers of the ten formed by the glass tubes at radial arms provided in the latter. The mixture was distributed equally among the eight lower chambers. In addition, 2.4 cubic meters per hour of hydrogen chloride gas (STP) was fed into the lowest chamber and recirculated from the product end of the column. Excess hydrogen chloride gas was vented from the system. The reaction product was found to be substantially free from organically bound chlorine and consisted of 87% distillable alkylbenzene (98% sulfonatable).

In the absence of the perforated plates, the reactor was only capable of yielding a tenth of the throughput and nevertheless gave an end product which contained traces of organically bound chlorine, while having only 75% distillable alkyl benzenes with a sulfonatable ratio of 98%.

Example III

The system of FIG. 5 was used to produce monochloroparaffin. 10 kg./h. of paraffin with a boiling point of 200–219° C. at standard pressure is forced into the reactor column with dimensions and construction as provided in Example II. 2.54 kilograms per hour (standard temperature and pressure) of chlorine is introduced into the lower eight reactor chambers through side-arms formed therein. The reactor temperature is held at 105–120°.

The liquid reaction product contains 46.0% by weight of nonreacted paraffin, 37.3% by weight of monochloroparaffins and 16.7% by weight of higher chlorinated paraffins. When the procedure was repeated using a reactor from which the perforated plates had been removed, the reaction product consisted of 52.4% by weight of nonreacted paraffin, 28.2% of monochloroparaffin and 19.4% by weight of higher chlorinated paraffins.

We claim:
1. A method of chemically reacting a catalytically hydrogenatable liquid with hydrogen to produce at least a hydrogenated product, said method comprising the steps of:
   suspending a hydrogenation catalyst in said hydrogenatable liquid to produce a suspension;
   passing a reaction mixture of both said hydrogenatable-liquid suspension and gaseous hydrogen upwardly through a reactor column vertically subdivided into a plurality of impacted reaction chambers by vertically spaced perforated horizontal plates;
   inducing said gaseous hydrogen to traverse said plates at a velocity of between 1 and 50 meters per second, thereby forming said hydrogenated product, said suspension, product and bubbles of said gaseous hydrogen substantially filling said column; and
   removing said product from said reactor column at the top thereof.

References Cited

UNITED STATES PATENTS 3,497,327   2/1970   Kehse _____ 23—288

LEWIS GOTTS, Primary Examiner

C. L. MILLS, Assistant Examiner

U.S. Cl. X.R.

23—284; 260—660, 671 R, 690; 261—123